(12) United States Patent
Li (10) Patent No.: US 9,759,189 B2
(45) Date of Patent: Sep. 12, 2017

(54) WIND POWER PLANT AND METHOD OF CONTROLLING WIND TURBINE GENERATOR IN A WIND POWER PLANT

(75) Inventor: Wen Zeng Li, Tianjin (CN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 757 days.

(21) Appl. No.: 14/234,738

(22) PCT Filed: Aug. 11, 2011

(86) PCT No.: PCT/CN2011/078250
§ 371 (c)(1),
(2), (4) Date: May 5, 2014

(87) PCT Pub. No.: WO2013/020289
PCT Pub. Date: Feb. 14, 2013

(65) Prior Publication Data
US 2014/0239640 A1    Aug. 28, 2014

(51) Int. Cl.
*F03D 7/04*    (2006.01)
*F03D 7/00*    (2006.01)
*F03D 17/00*   (2016.01)

(52) U.S. Cl.
CPC ............. *F03D 7/00* (2013.01); *F03D 7/047* (2013.01); *F03D 7/048* (2013.01); *F03D 17/00* (2016.05);
(Continued)

(58) Field of Classification Search
None
See application file for complete search history.

(56) References Cited

U.S. PATENT DOCUMENTS 6,975,925 B1 * 12/2005 Barnes ............... F03D 7/048
700/286
8,874,276 B2 * 10/2014 Garcia ............... F03D 7/0284
290/44
(Continued)

FOREIGN PATENT DOCUMENTS

CN      1871432 A       11/2006
DE   102009030886 A1    12/2010
(Continued)

OTHER PUBLICATIONS

Supplementary European Search Report for EP 11870657, dated Jun. 5, 2015.
(Continued)

*Primary Examiner* — Jason Mitchell
(74) *Attorney, Agent, or Firm* — Patterson + Sheridan, LLP (57) ABSTRACT

A wind power plant comprises at least a first and one or more other wind turbine generators (10, 20, 30, 40), wherein the first and one or more other wind turbine generators are communicatively coupled in order to exchange information between the first wind turbine generator and the one or more other wind turbine generators, and wherein a predetermined transfer relationship is established between the first and one or more other wind turbine generators, said predetermined transfer relationship indicating the degree to which the first wind turbine generator may use information from each of the one or more other wind turbine generator for the control of the first wind turbine.

23 Claims, 6 Drawing Sheets

(52) U.S. Cl.
CPC ....... *F05B 2270/321* (2013.01); *Y02E 10/723* (2013.01)

(56) References Cited

U.S. PATENT DOCUMENTS

| | | | |
|---|---|---|---|
| 2005/0090937 A1* | 4/2005 | Moore | F03D 7/047 700/286 |
| 2008/0079263 A1* | 4/2008 | Morjaria | F03D 7/0284 290/44 |
| 2008/0086281 A1* | 4/2008 | Santos | F03D 7/0292 702/127 |
| 2009/0160189 A1 | 6/2009 | Rasmussen | |
| 2011/0187106 A1 | 8/2011 | Ichinose et al. | |
| 2012/0169052 A1* | 7/2012 | Leipold-Buettner | F03D 7/0208 290/44 |

FOREIGN PATENT DOCUMENTS

| | | |
|---|---|---|
| EP | 2169218 A2 | 3/2010 |
| GB | 2475609 A | 5/2011 |
| TW | 201022529 A | 6/2010 |

OTHER PUBLICATIONS

International Search Report for PCT/CN2011/078250; dated May 24, 2012.

\* cited by examiner

WIND POWER PLANT AND METHOD OF CONTROLLING WIND TURBINE GENERATOR IN A WIND POWER PLANT

FIELD OF THE INVENTION

Embodiments of the invention generally relate to a wind power plant including at least a first and one or more other wind turbine generators and to a method of controlling a first wind turbine generator in a wind power plant.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid.

SUMMARY OF THE INVENTION

Embodiments of the invention generally relate to a wind power plant including at least a first and one or more other wind turbine generators and to a method of controlling a first wind turbine generator in a wind power plant.

One embodiment of the invention provides a wind power plant comprising at least a first and one or more other wind turbine generators, wherein the first and one or more other wind turbine generators are communicatively coupled in order to exchange information and wherein a predetermined transfer relationship is established between the first and one or more other wind turbine generators, said predetermined transfer relationship indicating the degree to which the first wind turbine generator may use information from each of the one or more other wind turbine generator for the control of the first wind turbine. The exchange of information at least comprises the reception of information at the first wind turbine generator from the one or more other wind turbine generators. The wind turbine generators in the wind power plant may be arranged to communicate, i.e. to work together, for example by backing up each other in case of hazardous conditions. Thus, the embodiment may increase the reliability, availability, and/or productivity of the wind power plant.

Another embodiment of the invention provides a method of controlling a first wind turbine in a wind power plant, the comprising one or more other wind turbine generators, the method comprising the steps of exchanging information between the first and one or more other wind turbine generators via a communicative coupling, and controlling the first wind turbine using information from the one or more other wind turbines generators according to a predetermined transfer relationship between the first and each of the one or more other wind turbine generators, said predetermined transfer relationship indicating the degree to which the first wind turbine generator may use information from each of the one or more other wind turbine generator.

Yet another embodiment of the invention relates to a computer program product containing computer code, which when executed on a computer performs the method of the invention.

Further embodiments are set forth in the dependent claims, the following description and the drawings.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As mentioned, one embodiment of the invention provides a wind power plant comprising at least a first and one or more other wind turbine generators, wherein the first and one or more other wind turbine generators are communicatively coupled in order to exchange information and wherein a predetermined transfer relationship is established between the first and one or more other wind turbine generators, said predetermined transfer relationship indicating the degree to which the first wind turbine generator may use information from each of the one or more other wind turbine generator for the control of the first wind turbine. The advantage hereof is that a wind turbine generator may use information obtained from another wind turbine. In case of for instance failure of a sensor, the output of which is necessary for the operation of a wind turbine, the wind turbine may keep on operating with corresponding information from another wind turbine. In another non-limiting example a wind turbine generator may receive information from other wind turbine generators on hazardous conditions. Thus, the wind turbine generators may be safer, operate more consistently and/or provide an extra power.

The information to be exchanged between the first and one or more other wind turbine generators is a signal comprising aerodynamic information and/or condition information. The condition information comprises information on one or more of the following states: disconnection of the wind power plant from the electrical grid; lightening; tripping of wind turbine generator; an extreme wind gust; a faulty sensor. The condition information may be regarded as digital information in that in most cases it may be regarded as on/off signals, such as "grid disconnected", "thunderstorm", "wind turbine generator has tripped".

The aerodynamic information comprises information on one or more of the following: wind direction; wind speed; wind shear; wind turbulence; wind gust depth; temperature; grid power characteristics. The aerodynamic information may be regarded as analog information having a magnitude in a certain range. Examples of such aerodynamic or analog information may be "wind direction", "wind speed", "wind gust depth", "temperature", "grid voltage", "grid current", etc.

The predetermined transfer relationship between the first and each of the one or more other wind turbine generators indicates a transfer value for potential wind directions, the transfer value indicating the degree to which the first wind turbine generator may use information from each of the one or more other wind turbines for a given wind direction. If the space surrounding the wind turbine generator is divided into a range of angular directions corresponding to potential wind directions, each angular direction is assigned a transfer value. Thus, when the actual or present wind direction is within or at a specified angular direction, the transfer value corresponding to that wind direction may be used to determine to which degree the first wind turbine generator may use the information from the other wind turbine generators. The set of transfer values may be denoted a transfer curve. In case the information may be used to the same degree at all wind directions, the transfer curve is a transfer circle. Alternatively the transfer curve may be of other shapes and in special cases some parts of the transfer curve may be cut out indicating that the information from the other wind turbine generators cannot be used for controlling the first wind turbine generator at the wind directions corresponding to the cut out parts of the transfer curve.

The transfer value for potential wind directions in the predetermined relationship corresponding to the present wind direction is multiplied to a signal from the one or more other wind turbine generators in order to render a signal for use in the control unit of the first wind turbine generator.

The transfer value for a given sector in the predetermined relationship corresponding to the present wind direction is multiplied to a signal from the one or more other wind turbine generators in order to render a signal for use in the control unit of the first wind turbine generator. This provides an easy way to use the information from the other wind turbine generator(s) for controlling the first wind turbine generator.

The transfer value may comprise information specific transfer values for specific types of information. Hereby, the degree to which the first wind turbine generator may use information from the one or more other wind turbine generators indicated in the predetermined transfer relationship may comprise different levels to which information may be used. Thus, for example it may be the case that some information cannot be used or that no information may be used, that some types of information can be used whilst other types of information cannot be used; or that all types of information can be used.

The predetermined transfer relationship depends upon wind characteristics at the first wind turbine generator and or at the one or more other wind turbine generator.

Such wind characteristics may be the direction of the wind, wind shear, and wind turbulence. Moreover, the predetermined transfer relationship depends upon the terrain wherein the first and/or one or more other wind turbine generator is/are located. Thus, if the wind power plant is located in hilly terrain, the transfer value may vary substantially at varying wind directions.

The predetermined transfer relationship may be stored in a control unit of the first wind turbine generator or in a SCADA server accessible by the first wind turbine generator.

The predetermined transfer relationship is determined before operation of the wind power plant and/or wherein the predetermined transfer relationship is updated periodically.

The first wind turbine generator further is communicatively coupled to a meteorological measuring mast comprising one or more meteorological sensors in order to exchange information and wherein a meteorological mast transfer relationship has been established, said meteorological mast transfer relationship indicating the degree to which the first wind turbine generator may use information from the meteorological mast.

As mentioned above, the invention also relates to method of controlling a first wind turbine in a wind power plant as well as a computer program product containing computer code, which when executed on a computer performs the method of the invention. The advantages hereof are as described above in relation to the wind power plant.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
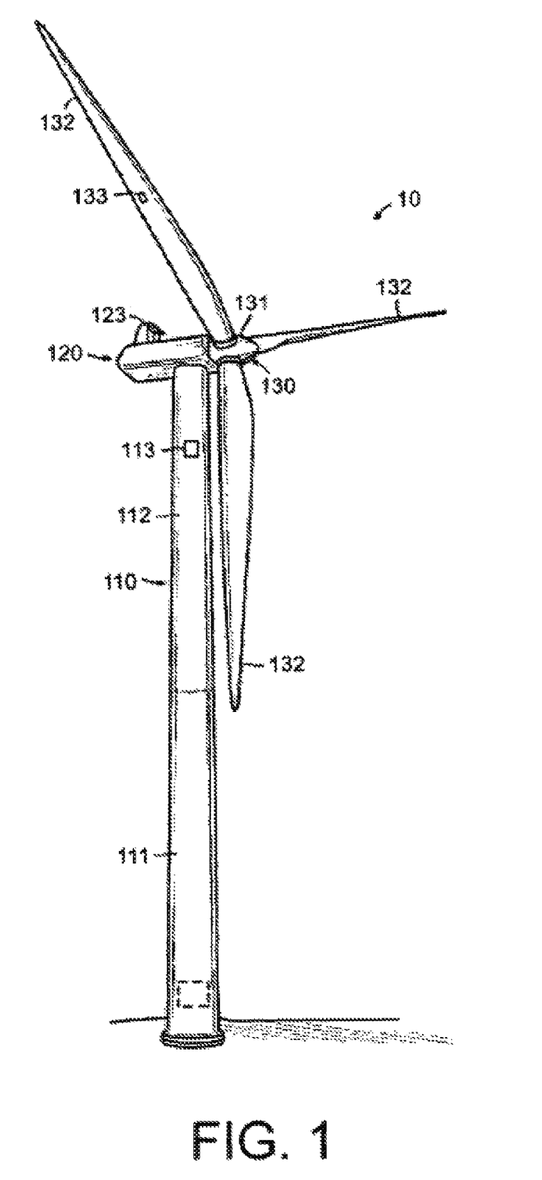
FIG. 1 illustrates an exemplary wind turbine 100 according to an embodiment of the invention.

FIG. 1 illustrates an exemplary wind turbine 10 according to an embodiment of the invention. As illustrated in FIG. 1, the wind turbine 10 includes a tower 110, a nacelle 120, and a rotor 130. In one embodiment of the invention, the wind turbine 10 may be an onshore wind turbine. However, embodiments of the invention are not limited only to onshore wind turbines. In alternative embodiments, the wind turbine 10 may be an off shore wind turbine located over a water body such as, for example, a lake, an ocean, or the like.

The tower 110 of wind turbine 10 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

The wind turbine 10 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high wind gusts. In such situations, the blades may be pitched to reduce the loads, thereby preventing damage to the blades.

FIG. 1 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 10. In some embodiments of the invention, the accelerometer 113 may be placed on the nacelle 120.

FIG. 1 also depicts a wind sensor 123. Wind sensor 123 may be configured to detect a direction of the wind at or near the wind turbine 10. By detecting the direction of the wind, the wind sensor 123 may provide useful data that may determine operations to yaw the wind turbine 10 into the wind. The wind sensor 123 may also detect a speed of the wind. Wind speed data may be used to determine an appropriate pitch angle that allows the blades 132 to capture a desired amount of energy from the wind. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 10.

While a strain gauge 133, accelerometer 113, and wind sensor 123 are described herein, embodiments of the invention are not limited to the aforementioned types of sensors. In general, any type and number of sensors may be placed at various locations of the wind turbine 10 to facilitate capturing data regarding structural health, performance, damage prevention, acoustics, and the like. For example, a pitch angle sensor may be placed at or near a wind turbine blade to determine a current pitch angle of the blade.

Figure 2:
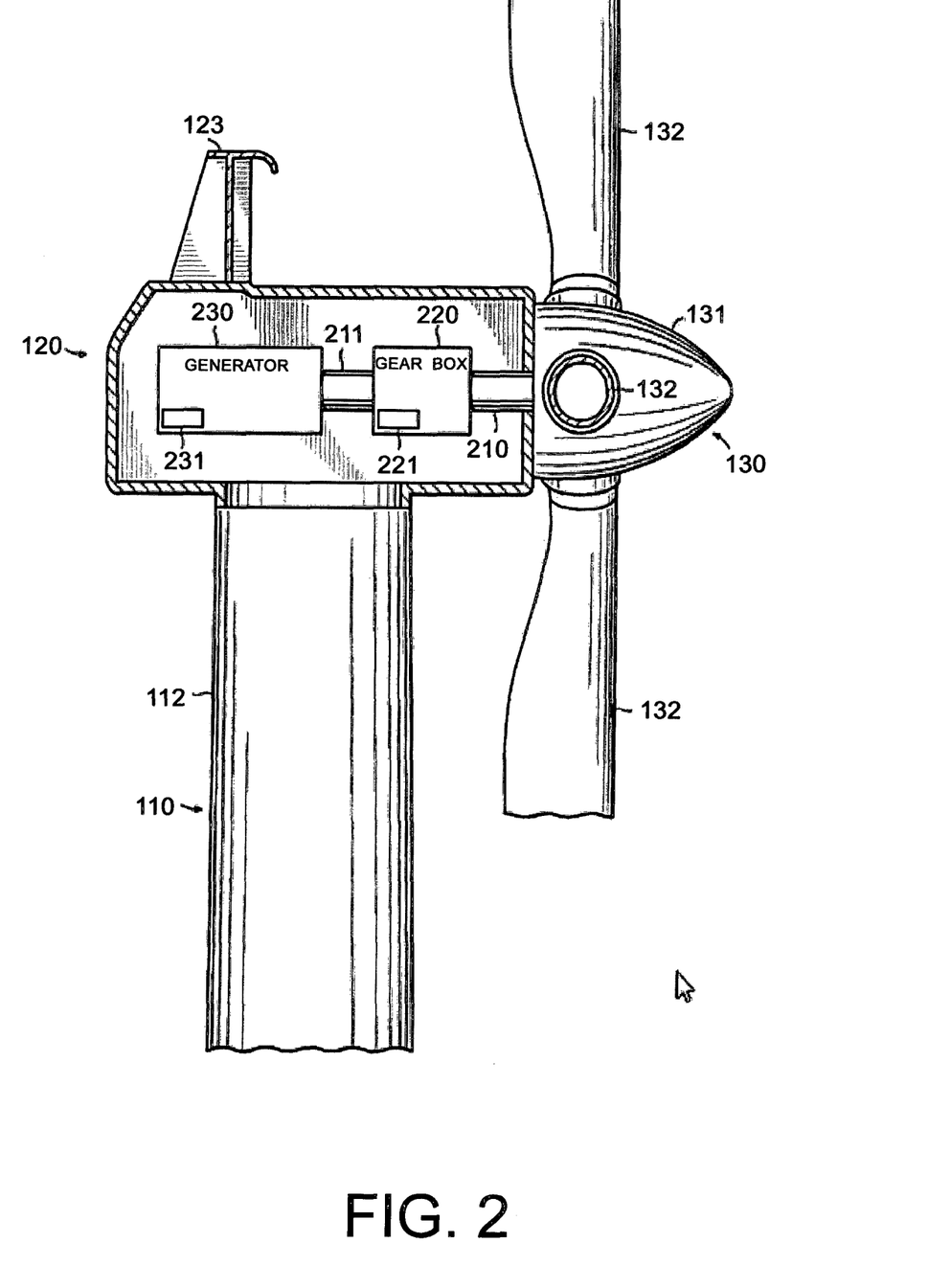
FIG. 2 illustrates a more detailed view of a nacelle 120 according to an embodiment of the invention.

FIG. 2 illustrates a more detailed view of a nacelle 120 according to an embodiment of the invention. As illustrated in FIG. 2, the nacelle 120 may include at least a low speed shaft 210, a high speed shaft 211, a gearbox 220, and a generator 230. In one embodiment, the low speed shaft 210 may couple the gearbox 230 to the rotor 130, as illustrated in FIG. 2. The gearbox 230 may rely on gear ratios in a drive train to provide speed and torque conversions from the rotation of the low speed shaft 210 to the rotor assembly of the generator 230 via the high speed shaft 211.

In an alternative embodiment, the low speed shaft 210 may directly connect the hub 130 with a rotor assembly of the generator 230 so that rotation of the rotor 130 directly drives the rotor assembly to spin relative to a stator assembly of the generator 230. In embodiments where the low speed shaft 210 is directly coupled to the hub 130, the gear box 220 may not be included, thereby allowing the nacelle 120 to be smaller and/or lighter.

The generator 230 may be configured to generate a three phase alternating current based on one or more grid requirements. In one embodiment, the generator 230 may be a synchronous generator. Synchronous generators may be configured to operate at a constant speed, and may be directly connected to the grid. In some embodiments, the generator 230 may be a permanent magnet generator. In alternative embodiments, the generator 230 may be an asynchronous generator, also sometimes known as an induction generator. Induction generators may or may not be directly connected to the grid. For example, in some embodiments, the generator 230 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

In some embodiments, a plurality of sensors may be included in the nacelle 120 to monitor the structural health and performance of the components therein, the quality of the power generated, and the like. For example, a sensor 221 may be placed in the gear box 220 to detect mechanical strain and wear/tear of the gear box 220. A sensor 231 may be placed in the generator 230 to detect generator speed, power generation, or the like.

Figure 3:
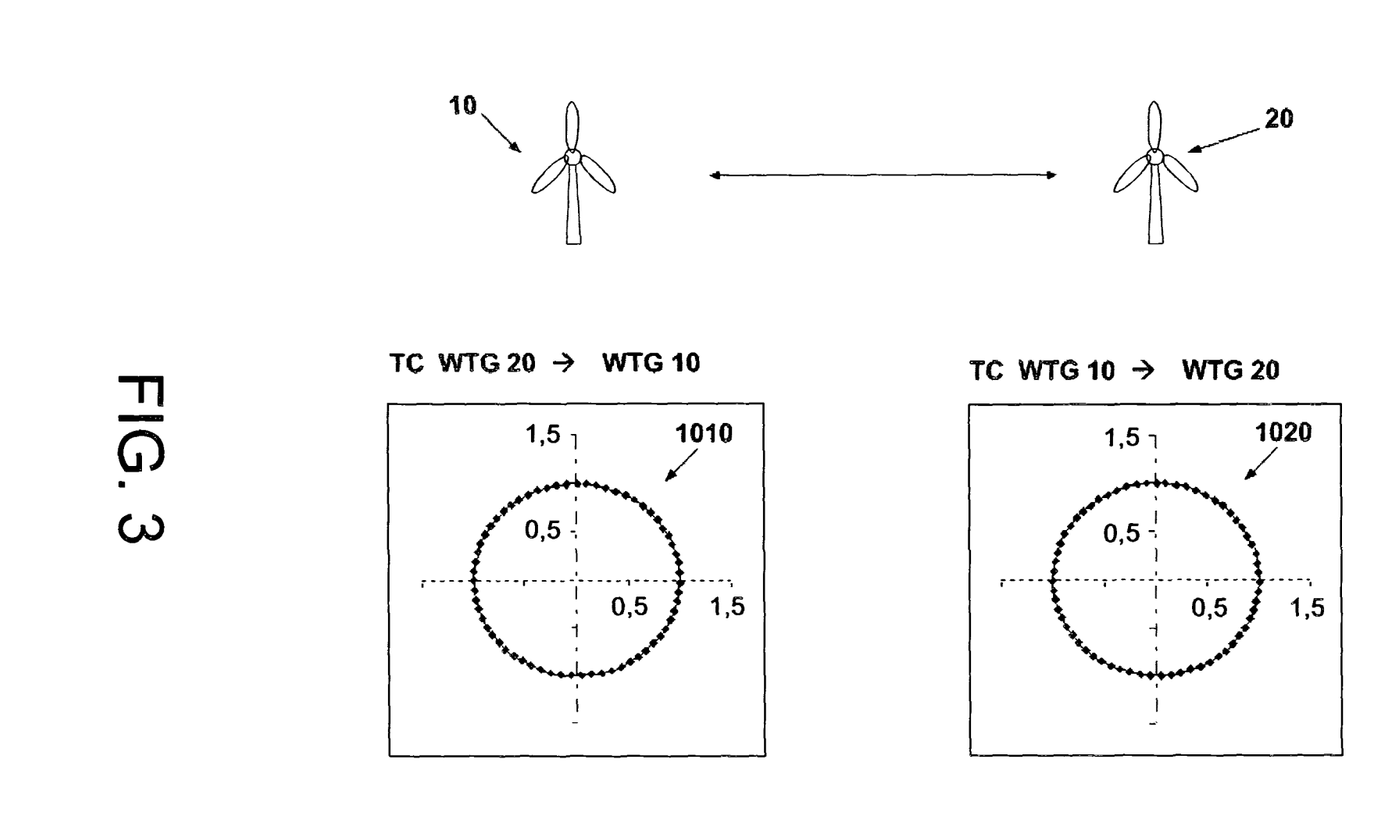
FIGS. 3 to 5 illustrates examples of transfer curves according to embodiments of the invention between wind turbine generators.

FIG. 3 shows two wind turbine generators 10, 20. The two wind turbine generators may be in a wind power plant (not shown) including two or more wind turbine generators. Wind power plants may include up to a hundred or even more wind turbine generators. The horizontal arrow between the two wind turbine generators 10, 20 indicates that the wind turbine generators 10, 20 are in communicative connection, i.e. that they are arranged to transmit and/or receive information from each other.

Such communicative connection may be by any appropriate wired or wireless means, and it may be directly between the wind turbine generators 10, 20 where the signal routing happens from one of the wind turbine generators 10, 20 to the other without any intermediate controller or wind turbine generator being involved. Alternatively, the communicative connection may be an indirect communication, e.g. using a SCADA system as a transfer centre.

For the wind turbine generator 10 a transfer relationship between the wind turbine generator 10 itself and the other wind turbine generator 20 comprises a transfer curve TC 1010. The transfer curve 1010 is shown in a polar coordinate system where the wind turbine generator 10 is situated in the origin.

The transfer curve 1010 may be in relation to specific types of information or it may relate to all types of information. Thus, other transfer curves (not shown in FIG. 3) may relate to the extent to which the wind turbine generator 10 may use other types of the information from the wind turbine generator 10. If the wind turbine generator 10 may use all information from the wind turbine generator 10 to a similar extent, only one transfer curve 1010 is required. If this is not the case, a transfer curve should exist for all different specific types of information which may be shared between the wind turbine generators 10, 20. For example, information specific transfer curves may exist for each of the following types of information: wind direction, wind velocity, pressure, temperature, grid voltage, grid current, grid frequency, wind shear, wind gust.

The transfer curve 1010 shows for all possible wind directions (corresponding to the angles 0° to 360° from the x-axis) the degree to which the wind turbine generator 10 may use information received from the wind turbine generator 20. This degree corresponds to the absolute value of the transfer curve corresponding to the present wind direction at the wind turbine 10. Thus, the wind direction currently present at the wind turbine generator 10 determines which point of the transfer curve 1010 should be used in order to determine to which extent the wind turbine generator 10 may reuse the information from the wind turbine generator 20. Thus, if the wind direction is North, the point of the transfer curve corresponding to 90° from the x-axis is to be used; if the wind is North-East the point of the transfer curve corresponding to 45° from the x-axis is to be used, when the wind is South the point of the transfer curve corresponding to 270° from the x-axis is to be used; etc.

The value of the transfer curve 1010 corresponding to the present wind direction at the wind turbine generator 10 may be multiplied to a signal from the wind turbine generator 20 in order to render a signal for use in the control unit of the wind turbine generator 10. In the example of FIG. 3 the transfer curve is at least substantially a transfer circle with a radius of 1. This indicates that the information from wind turbine 20 may be used as it is, corresponding to multiplication with 1, in the control of wind turbine 10. Such information may relate to any appropriate type of information. A few examples may be: temperature, pressure, wind direction, wind velocity, wind gusts, wind shear, grid conditions, disconnection of wind power plant from the electrical grid, thunderstorm, etc.

The transfer relationship between the wind turbine generator 10 and the wind turbine generator 20 may also include an indication of which types of information may be used (not shown in FIG. 3), in that it may be the case that some types of information may be used, whilst other types of information cannot be used, or alternatively that all types of information from the wind turbine generator 20 may be used in the wind turbine generator 10.

FIG. 3 also shows a transfer curve TC 1020 indicating to which degree the information from the wind turbine generator 10 may be used in the control of the wind turbine generator 20. In this case, the transfer curve 1020 is similar to the transfer curve 1010, indicating that the information may be shared symmetrically between the two wind turbine generators 10, 20. Moreover, the fact that the transfer curves 1010, 1020 are transfer circles having a radius of 1 indicates that the wind turbine generators 10, 20 may use information from each other. However, the information to be used may be limited to some types of information as indicated above.

Figure 4:
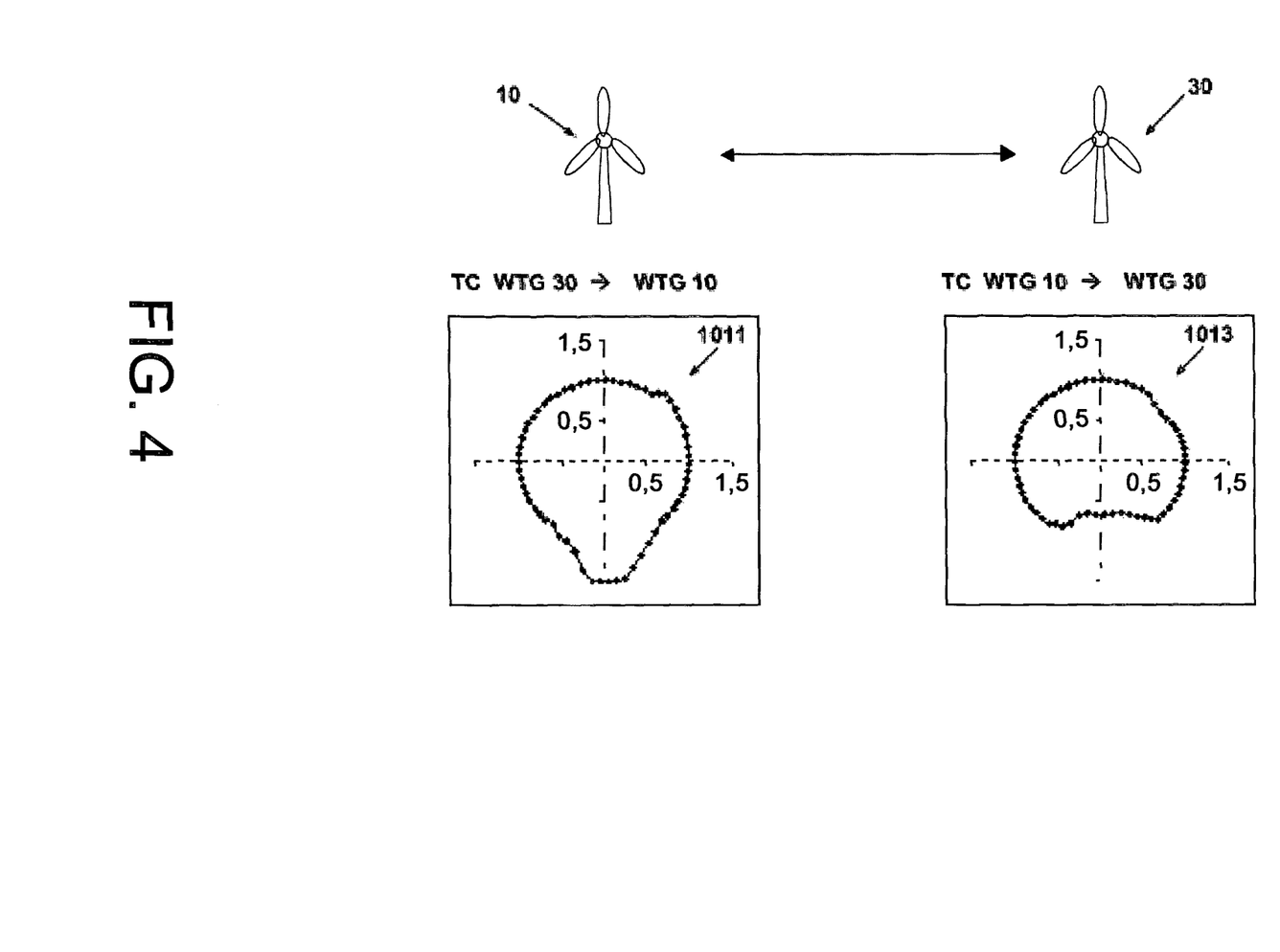

FIG. 4 shows two wind turbine generators 10, 30 of a wind power plant. As in FIG. 3, the horizontal arrow between the two wind turbine generators 10, 30 is meant to indicate that the wind turbine generators 10, 30 are in communicative connection. For the wind turbine generator 10 a transfer relationship between the wind turbine generator 10 itself and the other wind turbine generator 30 comprises a transfer curve TC 1011, whilst a transfer relationship between the wind turbine generator 30 and the wind turbine generator 10 comprises a transfer curve TC 1013. Again, the transfer curves are shown in polar coordinate systems where the wind turbine generator in question is situated in the origin.

As described in relation to FIG. 3, the transfer curves 1011 shows for all possible wind directions (corresponding to the angles 0° to 360° from the x-axis) the degree to which the wind turbine generator 10 may use information received from the wind turbine generator 30. This degree corresponds to the absolute value of the transfer curve corresponding to the present wind direction at the wind turbine 10. Thus, the wind direction currently present at the wind turbine generator 10 determines which point of the transfer curve 1010 should be used in order to determine to which extent the wind turbine generator 10 may reuse the information from the wind turbine generator 30 as described in relation to FIG. 3. The value of the transfer curve 1010 corresponding to the present wind direction at the wind turbine generator 10 may be multiplied to a signal from the wind turbine generator 30 in order to render a signal for use in the control unit of the wind turbine generator 10.

The transfer relationship between the wind turbine generator 10 and the wind turbine generator 30 may also include an indication of which types of information may be used (not shown in FIG. 4), in that it may be the case that some types of information may be used, whilst other types of information cannot be used, or alternatively that all types of information from the wind turbine generator 30 may be used in the wind turbine generator 10.

An example of a wind power plant having wind turbines with transfer circles 1010, 1020 (with unity value) may be an off shore wind power plant or a wind power plant in even terrain, where the wind turbine generators are located at sufficient distance from each other that neither of the wind turbines 10, 20 experiences wake effects from other wind turbine generators in any wind direction.

FIG. 4 also shows a transfer curve TC 1013 indicating to which degree the information from the wind turbine generator 10 may be used in the control of the wind turbine generator 30. In FIG. 4 the transfer curve 1013 is different from the transfer curve 1011, indicating that the information may not be shared symmetrically between the two wind turbine generators 10, 30.

In the example of FIG. 4 the transfer curves 1011, 1013 are not transfer circles with a radius of 1. This indicates that the information from each of the wind turbines 10, 30 cannot be reused as it is, corresponding to multiplication with 1, in the control of wind turbine 10 for all wind directions, as will be described in a bit more detail in the following. From the transfer curve 1011, it may be seen that for wind directions prevailing at the wind turbine 10 of between about 45° (corresponding to North-East) to about 225° (corresponding to South-West), the value of the transfer curve 1011 is approximately 1, indicating that the wind turbine generator 10 may reuse the information from the wind turbine generator 30 unchanged, corresponding to a multiplication with 1. At other wind directions the value of the transfer curve 1011 is larger than 1, indicating that the information from the wind turbine 30 has to be amplified (corresponding to a multiplication with the value of the transfer curve) in order to be used in the control of the wind turbine generator 10. For example, the value of the transfer curve at a southward wind direction, corresponding to 270°, is 1.5.

The transfer curve 1013 also shows that for wind directions prevailing at the wind turbine 30 of between about 45° (corresponding to North-East) to about 225° (corresponding to South-West), the value of the transfer curve 1013 is approximately 1, indicating that the wind turbine generator 30 may reuse the information from the wind turbine generator 10 unchanged. At other wind directions the value of the transfer curve 1013 is smaller than 1, indicating that the information from the wind turbine 10 has to be reduced (corresponding to a multiplication with the value of the transfer curve) in order to be used in the control of the wind turbine generator 30. For example, the value of the transfer curve at a southward wind direction, corresponding to 270°, is about 0.6-0.7.

An example of a wind power plant with wind turbines having transfer circles 1011, 1013 may be a wind power plant situated in hilly terrain where e.g. the measured wind velocity at one wind turbine at specific wind directions are know to be larger than the wind velocity measured at other wind turbines at the specific wind directions.

As described in connection with FIG. 3, the information to be shared may relate to any appropriate type of information. A few examples may be: temperature, pressure, wind direction, wind velocity, wind gusts, wind shear, grid conditions, disconnection of wind power plant from the electrical grid, thunderstorm, etc. However, the information to be used may be limited to some types of information as indicated in the transfer relationship, as described above.

As described in relation to FIG. 3, the transfer curves 1011, 1013 may be in relation to specific types of information, and other transfer curves (not shown in FIG. 4) may relate to the extent to which the wind turbine generators 10, 30, respectively, may use other types of the information from the wind turbine generators 30, 10, respectively. If the wind turbine generators 10, 30, respectively, may use all information from the wind turbine generator 30, 10, respectively, to a similar extent, only one transfer curve 1011, 1013, respectively, is required. If this is not the case, a transfer curve should exist for all different specific types of information which may be shared between the wind turbine generators 10, 30.

Figure 5:
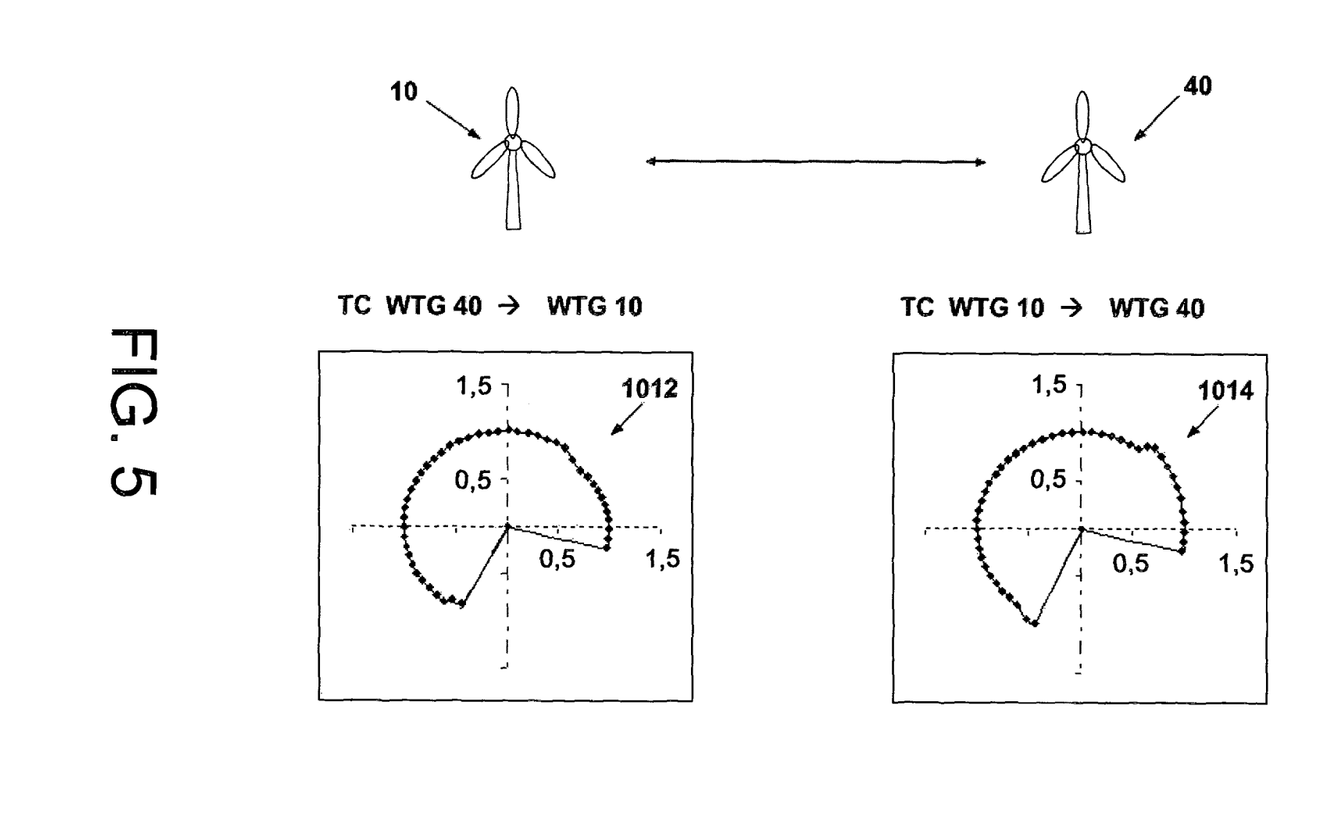

FIG. 5 shows transfer curves 1012, 1014 between wind turbine generators 10, 40. Much of the description of FIGS. 3 and 4 in relation to transfer curves in general is also relevant to FIG. 5 and will therefore not be repeated here. Each of the two transfer curves 1012, 1014 of FIG. 5 has a cut-out section, from about 240° to about 345°, corresponding to a transfer value of zero. Thus, at wind directions from South-South-West to about a direction of about 345°, the information from one of the wind turbine generators 10, 40 cannot be used at the other wind turbine generator 40, 10.

Corresponding to the description of relation to FIGS. 3 and 4, the transfer curves 1012, 1014 may be in relation to one or more specific types of information or it may relate to all types of information.

Throughout the description of FIGS. 3 to 5, the indications in degrees (°) refer to a polar coordinate system having angular polar coordinates between 0° and 360°.

Figure 6:
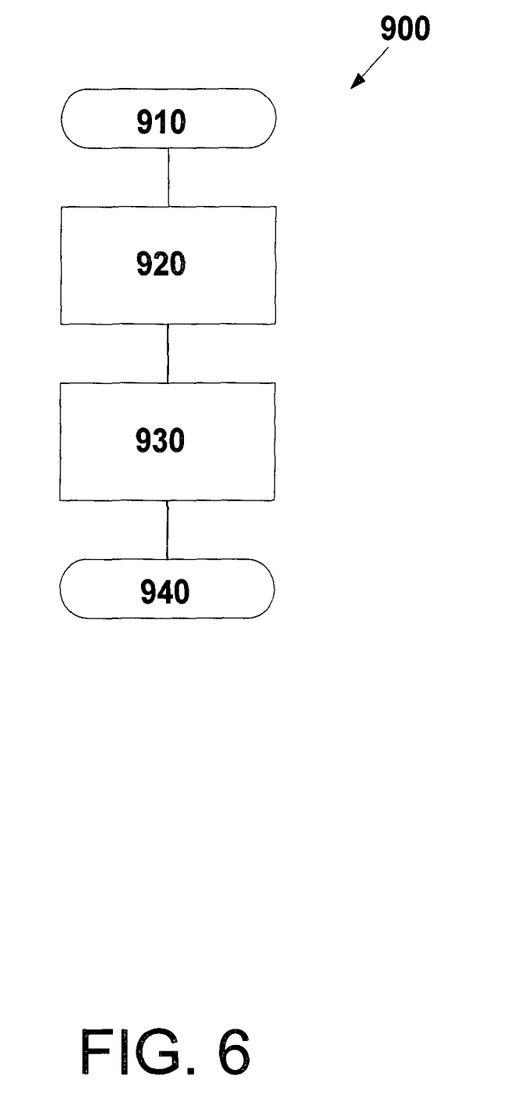
FIG. 6 illustrates a flow diagram of a method according to the invention.

FIG. 6 illustrates a flow diagram of a method 900 according to the invention for controlling a first wind turbine in a wind power plant. The method starts in step 910, and continues to step 920 wherein the first wind turbine generator receives information from one or more other wind turbine generators via a communicative coupling. In the subsequent step 930, the first wind turbine generator is controlled using information from the one or more other wind turbines generators according to a predetermined transfer relationship between the first and each of the one or more other wind turbine generators. As described above, the predetermined transfer relationship indicating the degree to which the first wind turbine generator may use information from each of the one or more other wind turbine generator. The method ends in step 940.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A wind power plant comprising at least a first wind turbine generator and one or more other wind turbine generators, wherein the first wind turbine generator and one or more other wind turbine generators are communicatively coupled to exchange information between the first wind turbine generator and the one or more other wind turbine generators, and wherein a predetermined transfer relationship is established between the first wind turbine generator and one or more other wind turbine generators, said predetermined transfer relationship indicating transfer values associated with different wind directions, the transfer values indicating a degree to which the first wind turbine generator uses information from each of the one or more other wind turbine generators for the control of the first wind turbine generator for the associated different wind directions.

2. A wind power plant according to claim 1, wherein the information to be exchanged between the first wind turbine generator and one or more other wind turbine generators is a signal comprising aerodynamic information and/or condition information.

3. A wind power plant according to claim 2, wherein the condition information comprises information on one or more of the following states: disconnection of the wind power plant from the electrical grid; lightening; tripping of wind turbine generator; an extreme wind gust; a faulty sensor; and grid power characteristics.

4. A wind power plant according to claim 2, wherein the aerodynamic information comprises information on one or more of the following: wind direction; wind speed; wind shear; wind turbulence; wind gust depth; and temperature.

5. A wind power plant according to claim 1, wherein the transfer value for potential wind directions in the predetermined relationship corresponding to the present wind direction is multiplied with a signal from the one or more other wind turbine generators in order to render a signal for use in the control unit of the first wind turbine generator.

6. A wind power plant according to claim 1, wherein the transfer value comprises information specific transfer values for specific types of information.

7. A wind power plant according to claim 1, wherein the predetermined transfer relationship depends upon wind characteristics at the first wind turbine generator and/or at the one or more other wind turbine generators.

8. A wind power plant according to claim 1, wherein the predetermined transfer relationship depends upon the terrain wherein the first wind turbine generator and/or one or more other wind turbine generator(s) is/are located.

9. A wind power plant according to claim 1, wherein the predetermined transfer relationship is stored in a control unit of the first wind turbine generator or in a SCADA server accessible by the first wind turbine generator.

10. A wind power plant according to claim 1, wherein the predetermined transfer relationship is determined before operation of the wind power plant and/or wherein the predetermined transfer relationship is updated periodically.

11. A wind power plant according to claim 1, wherein the first wind turbine generator further is communicatively coupled to a meteorological measuring mast comprising one or more meteorological sensors to exchange information and wherein a meteorological mast transfer relationship has been established, said meteorological mast transfer relationship indicating the degree to which the first wind turbine generator may use information from the meteorological mast.

12. A method of controlling a first wind turbine generator in a wind power plant, comprising one or more other wind turbine generators, the method comprising:
at the first wind turbine generator, receiving information from one or more other wind turbine generators via a communicative coupling; and
controlling the first wind turbine generator using information from the one or more other wind turbines generators according to a predetermined transfer relationship between the first wind turbine generator and each of the one or more other wind turbine generators, said predetermined transfer relationship indicating transfer values associated with different wind directions, the transfer values indicating a degree to which the first wind turbine generator may use information from each of the one or more other wind turbine generators for the associated different wind directions.

13. A method of controlling the first wind turbine generator in the wind power plant according to claim 12, wherein the information to be exchanged between the first wind turbine generator and one or more other wind turbine generators comprises a signal comprising aerodynamic information and/or condition information.

14. A method of controlling the first wind turbine generator in the wind power plant according to claim 13, wherein the condition information comprises information on one or more of the following states: disconnection of the wind power plant from the electrical grid; lightening; tripping of wind turbine generator; an extreme wind gust; a faulty sensor; and grid power characteristics.

15. A method of controlling the first wind turbine generator in the wind power plant according to claim 13, wherein the aerodynamic information comprises information on one or more of the following: wind direction; wind speed; wind shear; wind turbulence; wind gust depth; and temperature.

16. A method of controlling the first wind turbine generator in the wind power plant according to claim 12, wherein controlling the first wind turbine generator comprises:
determining the present wind direction and the transfer value corresponding to the present wind direction; and
multiplying the signal from the one or more wind turbine generators with the transfer value for the present wind direction in order to render a signal for use in the control of the first wind turbine generator.

17. A method of controlling the first wind turbine generator in the wind power plant according to claim 16, wherein the transfer value comprises information specific transfer values for specific types of information.

18. A method of controlling the first wind turbine generator in the wind power plant according to claim 12, wherein the predetermined transfer relationship depends upon wind characteristics at the first wind turbine generator and/or at the one or more other wind turbine generators.

19. A method of controlling the first wind turbine generator in the wind power plant according to claim 12, wherein the predetermined transfer relationship depends upon the terrain wherein the first wind turbine generator and/or one or more other wind turbine generator(s) is/are located.

20. A method of controlling the first wind turbine generator in the wind power plant according to claim 12, wherein the method comprises storing the predetermined transfer relationship in a control unit of the first wind turbine generator or in a SCADA server accessible by the first wind turbine generator.

21. A method of controlling the first wind turbine generator in the wind power plant according to claim 12, wherein the predetermined transfer relationship is determined before operation of the wind power plant and/or wherein the predetermined transfer relationship is updated periodically.

22. A method of controlling the first wind turbine generator in the wind power plant according to claim 12, wherein the first wind turbine generator further is communicatively coupled to a meteorological measuring mast comprising one or more meteorological sensors to exchange information and wherein a meteorological mast transfer relationship has been established, said meteorological mast transfer relationship indicating the degree to which the first wind turbine generator may use information from the meteorological mast, and wherein the method comprises controlling the first wind turbine generator using the meteorological mast transform relationship.

23. A computer program product containing computer code, which when executed on a computer performs an operation of controlling a first wind turbine generator in a wind power plant, comprising one or more other wind turbine generators, the operation comprising:
at the first wind turbine generator, receiving information from one or more other wind turbine generators via a communicative coupling; and
controlling the first wind turbine generator using information from the one or more other wind turbines generators according to a predetermined transfer relationship between the first wind turbine generator and each of the one or more other wind turbine generators, said predetermined transfer relationship indicating transfer values associates with different wind directions, the transfer values indicating a degree to which the first wind turbine generator may use information from each of the one or more other wind turbine generators for the associated different wind directions.

* * * * *